US012068713B2

(12) United States Patent
Liu et al.

(10) Patent No.: US 12,068,713 B2
(45) Date of Patent: Aug. 20, 2024

(54) SENSORLESS COMMUTATION ERROR COMPENSATION SYSTEM AND METHOD FOR BRUSHLESS MOTOR

(71) Applicants: Ningbo Institute of Technology, Beihang University, Ningbo (CN); Beihang University, Beijing (CN)

(72) Inventors: Gang Liu, Beijing (CN); Hao Jin, Beijing (CN); Shiqiang Zheng, Beijing (CN); Haitao Li, Beijing (CN); Tong Wen, Beijing (CN); Sha He, Beijing (CN)

(73) Assignees: Ningbo Institute of Technology, Beihang University, Ningbo (CN); Beihang University, Beijing (CN)

( * ) Notice: Subject to any disclaimer, the term of this patent is extended or adjusted under 35 U.S.C. 154(b) by 126 days.

(21) Appl. No.: 17/995,410

(22) PCT Filed: Jul. 22, 2020

(86) PCT No.: PCT/CN2020/103426
§ 371 (c)(1),
(2) Date: Oct. 4, 2022

(87) PCT Pub. No.: WO2021/253562
PCT Pub. Date: Dec. 23, 2021

(65) Prior Publication Data
US 2023/0179127 A1 Jun. 8, 2023

(30) Foreign Application Priority Data
Jun. 17, 2020 (CN) .......................... 202010556838.4

(51) Int. Cl.
*H02P 6/182* (2016.01)
*H02P 21/18* (2016.01)

(52) U.S. Cl.
CPC .............. *H02P 6/182* (2013.01); *H02P 21/18* (2016.02)

(58) Field of Classification Search
CPC .................................. H02P 6/182; H02P 21/18
See application file for complete search history.

(56) References Cited

U.S. PATENT DOCUMENTS

| 2013/0049656 | A1* | 2/2013 | Yasui | ...................... H02P 21/00 318/400.32 |
| 2018/0159451 | A1 | 6/2018 | Boscolo | |
| 2020/0010094 | A1* | 1/2020 | Nakada | ............... B60W 50/023 |
| 2023/0246579 | A1* | 8/2023 | Taniguchi | ............... H02P 21/14 318/700 |

FOREIGN PATENT DOCUMENTS

| CN | 105141201 A | 12/2015 |
| CN | 105515486 A | 4/2016 |

(Continued)

OTHER PUBLICATIONS

China National Intellectual Property Administration (ISA/CN), International Search Report for PCT/CN2020/103426, mailing date Jan. 29, 2021, 2 pages.

(Continued)

*Primary Examiner* — Zoheb S Imtiaz
(74) *Attorney, Agent, or Firm* — Jaffery Watson Mendonsa & Hamilton LLP (57) ABSTRACT

A sensorless commutation error compensation system for a brushless motor, comprises: a brushless motor (200) and a commutation logic module circuit (100). The commutation logic module circuit (100) is connected to three virtual Hall signal output ends of the brushless motor (200), and used for receiving three virtual Hall signals output by the brushless motor (200), obtaining three error compensation angle signals on the basis of the three virtual Hall signals, respectively superimposing the three error compensation angle (Continued)

signals and the three virtual Hall signals to form superposition results, and controlling the brushless motor (200) to adjust commutation timing on the basis of the superposition results, so as to achieve commutation error compensation. The system controls commutation errors on the basis of currents and counter-electromotive forces of three phases, instead of controlling the commutation errors on the basis of the current and the counter-electromotive force of one of the three phases, so that a torque ripple of a brushless direct-current motor can be reduced and a working efficiency of the motor can be improved.

9 Claims, 4 Drawing Sheets

(56) References Cited

FOREIGN PATENT DOCUMENTS

| | | |
|---|---|---|
| CN | 106059409 A | 10/2016 |
| CN | 106655918 A | 5/2017 |
| CN | 107222135 A | 9/2017 |
| CN | 107395072 A | 11/2017 |
| KR | 101686345 B1 | 12/2016 |

OTHER PUBLICATIONS

Chen, Shao-Hua, et al., "Sensorless full speed range control strategy of high-speed maglev brushless DC motor", Electric Machines and Control, Apr. 2017, 10 pages, vol. 21, No. 4, China.

\* cited by examiner

| receiving, by the commutation logic module circuit, the three virtual Hall signals output by the brushless motor, and obtaining the three error compensation angle signals on the basis of the three virtual Hall signals | S110 |

↓

| respectively superimposing, by the commutation logic module circuit, the three error compensation angle signals and the three virtual Hall signals to form the superposition results, and controlling the brushless motor to adjust the commutation timing on the basis of the superposition results to compensate commutation errors | S120 |

FIG. 6

SENSORLESS COMMUTATION ERROR COMPENSATION SYSTEM AND METHOD FOR BRUSHLESS MOTOR

CROSS-REFERENCE TO RELEVANT APPLICATIONS

This application is a national stage application of International Patent Application No. PCT/CN2020/103426, filed Jul. 22, 2020, which claims the priority to Chinese patent application No. 202010556838.4, entitled "SENSORLESS COMMUTATION ERROR COMPENSATION SYSTEM AND METHOD FOR BRUSHLESS MOTOR," filed on Jun. 17, 2020, to the China National Intellectual Property Administration, the entire contents of each of which are incorporated herein by reference in their entireties.

TECHNICAL FIELD

The present disclosure relates to the technical field of brushless motors, and more particularly to a sensorless commutation error compensation system and method for a brushless motor.

BACKGROUND

Most of the existing commutation methods for brushless direct-current motors adopt three Hall signals or encoders to form six commutation signals by the combination of high and low levels. However, installing a position sensor not only increases the power consumption of a system, but also reduces the system's reliability, so a sensorless commutation method has become a research hotspot in recent years.

For a sensorless brushless motor, the most classic commutation method is a counter-electromotive force zero-crossing method, which is widely used in industry due to its simplicity and reliability thereof. However, a processing circuit may delay a detection signal, which will affect commutation accuracy and reduce the working performances of the motor. Therefore, how to realize sensorless commutation error compensation for a brushless motor is still an urgent problem to be solved.

SUMMARY

(I) Technical Problem to be Solved

The technical problem to be solved by the present disclosure is to solve the existing problem of how to realize sensorless commutation error compensation for a brushless motor.

(II) Technical Solutions

In order to solve the technical problem above, the embodiments of the present disclosure provide a sensorless commutation error compensation system and method for a brushless motor.

In a first aspect, an embodiment of the present disclosure provides a sensorless commutation error compensation system for a brushless motor, comprising: a brushless motor and a commutation logic module circuit, wherein:

the commutation logic module circuit is connected to three virtual Hall signal output ends of the brushless motor, and used for receiving three virtual Hall signals output by the brushless motor, obtaining three error compensation angle signals on the basis of the three virtual Hall signals, respectively superimposing the three error compensation angle signals and the three virtual Hall signals to form superposition results, and controlling the brushless motor to adjust commutation timing on the basis of the superposition results, so as to achieve commutation error compensation.

In a second aspect, an embodiment of the present disclosure also provides a sensorless commutation error compensation method for a brushless motor, wherein the sensorless commutation error compensation method for the brushless motor is applicable to any of the sensorless commutation error compensation system for the brushless motor mentioned above; and the sensorless commutation error compensation method for the brushless motor comprises:

receiving, by the commutation logic module circuit, the three virtual Hall signals output by the brushless motor, and obtaining the three error compensation angle signals on the basis of the three virtual Hall signals; and respectively superimposing, by the commutation logic module circuit, the three error compensation angle signals and the three virtual Hall signals to form the superposition results, and controlling the brushless motor to adjust the commutation timing on the basis of the superposition results, so as to achieve commutation error compensation.

(III) Beneficial Effects

Compared with the prior art, the foregoing technical solutions in accordance with the embodiments of the present disclosure have the following advantages.

According to the sensorless commutation error compensation for the brushless motor in accordance with the embodiments of the present disclosure, the three virtual Hall signals output by the brushless motor are received by connecting the commutation logic module circuit to the three virtual Hall signal output ends of the brushless motor; the three error compensation angle signals are obtained on the basis of the three virtual Hall signals, and the three error compensation angle signals and the three virtual Hall signals are respectively superimposed to form the superposition results; then the brushless motor is controlled to adjust the commutation timing on the basis of the superposition results so as to realize commutation error compensation. In essence, the commutation errors are controlled on the basis of currents and counter-electromotive forces of three phases, instead of controlling the commutation errors on the basis of the current and the counter-electromotive force of one of the three phases, so that a torque ripple of a brushless direct-current motor can be reduced and a working efficiency of the motor can be improved.

It is to be understood that the foregoing general description and the following detailed description are exemplary and explanatory only and cannot limit the present disclosure.

BRIEF DESCRIPTION OF THE DRAWINGS

The drawings herein are incorporated into the specification and constitute a part of the specification, show the embodiments consistent with the present disclosure, and serve to explain the principles of the present disclosure together with the specification.

In order to illustrate the technical solutions in the embodiments of the present disclosure or the prior art more clearly, the drawings to be used in the description of the embodiments or the prior art will be briefly described below.

Obviously, those of ordinary skills in the art can also obtain other drawings based on these drawings without going through any creative work.

DETAILED DESCRIPTION OF THE EMBODIMENTS

To make the objects, technical solutions, and advantages of the embodiments of the present disclosure clearer, the technical solutions in the embodiments of the present disclosure will be described clearly and completely below. Apparently, the described embodiments are merely some but not all the embodiments of the present disclosure. Based on the embodiments of the present disclosure, all other embodiments obtained by those of ordinary skills in the art without going through any creative work shall fall within the scope of protection of the present disclosure.

Figure 1:
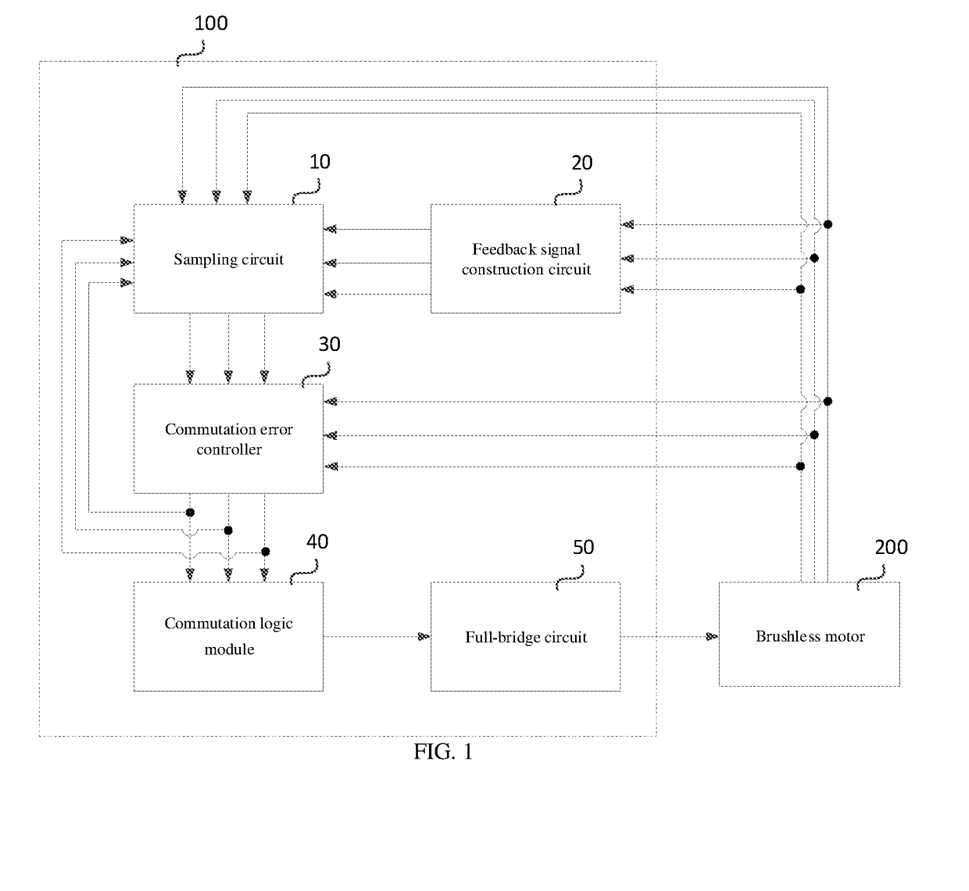
FIG. 1 is a structural block diagram of a sensorless commutation error compensation system for a brushless motor in accordance with an embodiment of the present disclosure.

FIG. 1 is a structural block diagram of a sensorless commutation error compensation system for a brushless motor in accordance with an embodiment of the present disclosure. Referring to FIG. 1, the sensorless commutation error compensation system for the brushless motor may include a brushless motor 200 and a commutation logic module circuit 100. The commutation logic module circuit 100 is connected to three virtual Hall signal output ends of the brushless motor 200, and may be configured to receive three virtual Hall signals output by the brushless motor 200, obtain three error compensation angle signals based on the three virtual Hall signals, respectively, superimpose the three error compensation angle signals and the three virtual Hall signals to form superposition results, and control the brushless motor 100 to adjust commutation timing based on the superposition results, so as to achieve commutation error compensation.

Because it is difficult to reflect commutation errors using feedback information of one phase alone, the commutation errors may not be eliminated completely. The foregoing technical solution controls the commutation errors based on feedback information of three phases (such as currents and counter-electromotive forces, and the like), instead of controlling the commutation errors on the basis of the feedback information of one of the three phases, so that a torque ripple of a brushless direct-current motor can be reduced and the working efficiency of the motor can be improved.

A direction of each arrow in FIG. 1 indicates a direction of data transmission when modules at both ends of the arrow interact with each other. Referring to FIG. 1, the commutation logic module circuit 100 may include a sampling circuit 10, a feedback signal construction circuit 20, a commutation error controller 30, a commutation logic module 40, and a full-bridge circuit 50. The input ends of the feedback signal construction circuit 20 are connected to the three virtual Hall signal output ends of the brushless motor 200. The output ends of the feedback signal construction circuit 20, the three virtual Hall signal output ends of the brushless motor 200, and three output ends of the commutation error controller 30 are all connected to the input ends of the sampling circuit 10. The three output ends of the sampling circuit 10 are connected to three input ends of the commutation error controller 30. The three output ends of the commutation error controller 30 may also be electrically connected to the three input ends of the commutation logic module 40 in one-to-one correspondence. The input ends of the commutation error controller 30 are connected to the three virtual Hall signal output ends of the brushless motor 200. An output end of the commutation logic module 40 may be connected to an input end of the full-bridge circuit 50. An output end of the full-bridge circuit 50 may be connected to an input end of the brushless motor 200.

Since the three virtual Hall signals output by the brushless motor 200 cannot directly reflect the commutation errors, when the commutation error compensation system works, the three virtual Hall signals of the brushless motor 200 are output to the feedback signal construction circuit 20, and the feedback signal construction circuit 20 recombines the three virtual Hall signals (hereinafter, for convenience of explanation, signals obtained by the feedback signal construction circuit 20 recombining the virtual Hall signals are referred to as basic signals), so that the commutation errors can be highlighted.

The sampling circuit 10 may determine a sampling time and a sampling object according to the operation of the brushless motor (which may be determined based on three virtual Hall signals), sampling, and output a sampling result. The sampling result may represent three feedback parameters, and the three feedback parameters. Each of feedback parameters may correspond to a respective virtual Hall signal of the three virtual Hall signals.

The commutation error controller 30 has three ways that may use the three feedback parameters, respectively, to eliminate commutation errors of three virtual Hall sensors. Specifically, the commutation error controller 30 may obtain three error compensation angles based on the three feedback parameters, respectively, and may superimpose each respective error compensation angle of the three error compensation angles with a time series of three virtual Hall signals corresponding to the respective error compensation angle to generate compensated commutation signals.

The commutation logic module 40 may generate digital signals for controlling the on-off of the full-bridge circuit 50 based on the compensated commutation signals.

Based on the digital signals output by the commutation logic module 40, the full-bridge circuit 50 adjusts an on-off status of an internal MOS tube of the full-bridge circuit 50, then controls a current and a voltage of an internal winding of the brushless motor, and adjusts the commutation timing of the brushless motor, so as to compensate the commutation error. The full-bridge circuit in the present disclosure may be an existing full-bridge circuit and will not be elaborated in detail in the present disclosure.

Figure 2:
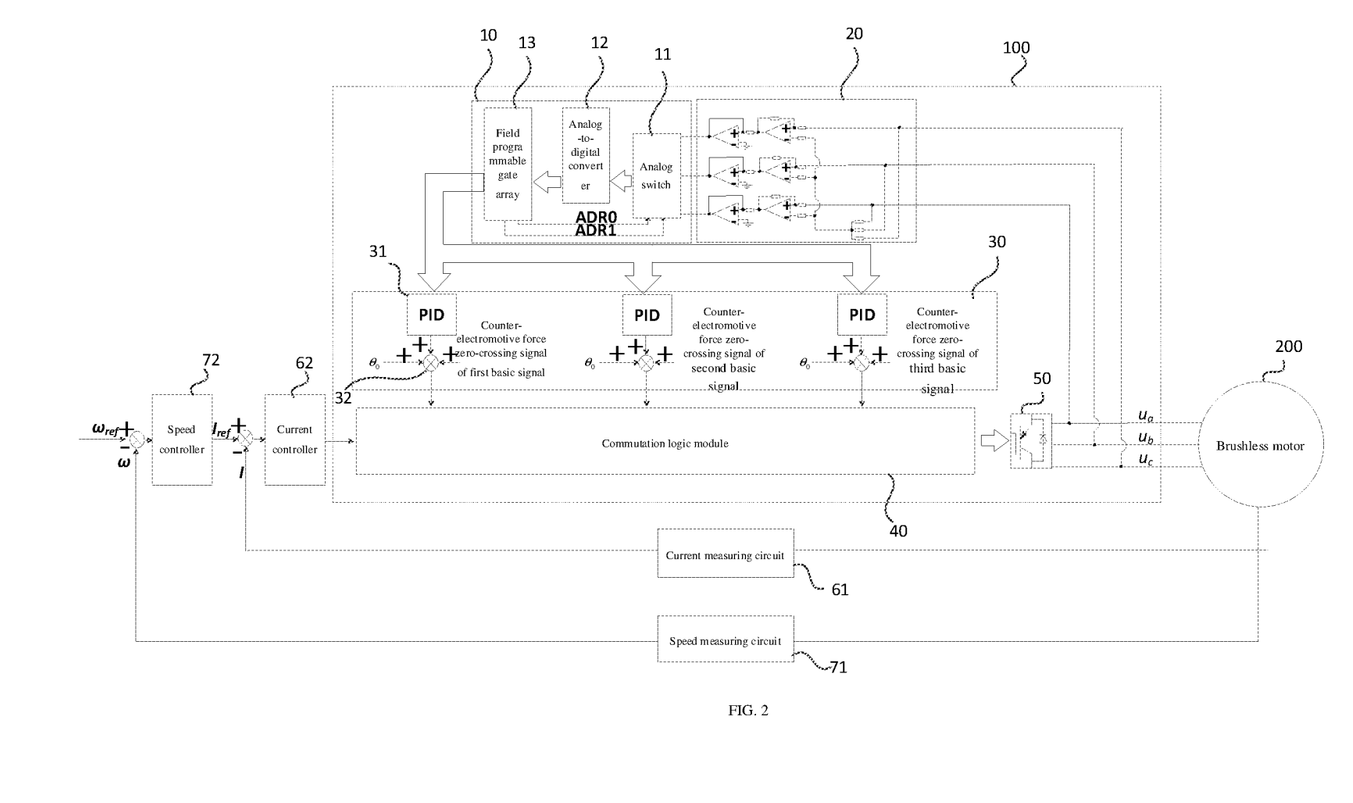
FIG. 2 is a schematic structural diagram of the sensorless commutation error compensation system for the brushless motor in accordance with the embodiment of the present disclosure.
Figure 3:
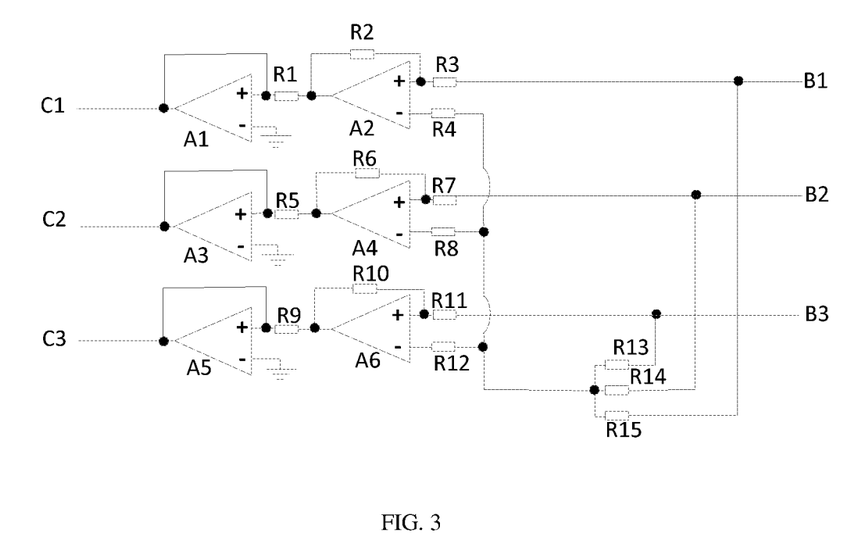
FIG. 3 is an enlarged drawing of a feedback signal construction circuit in FIG. 2.

In the present disclosure, there are a plurality of specific setup solutions of the feedback signal construction circuit, which are not limited by the present disclosure, as long as the commutation errors can be highlighted. FIG. 2 is a schematic structural diagram of the sensorless commutation error compensation system for the brushless motor in accordance with the embodiment of the present disclosure. FIG. 3 is an enlarged drawing of the feedback signal construction circuit in FIG. 2. Referring to FIG. 2 and FIG. 3, the feedback signal construction circuit comprises a first operational amplifier A1, a second operational amplifier A2, a third operational amplifier A3, a fourth operational amplifier A4, a fifth operational amplifier A5, a sixth operational amplifier A6, a first resistor R1, a second resistor R2, a third resistor R3, a fourth resistor R4, a fifth resistor R5, a sixth resistor R6, a seventh resistor R7, an eighth resistor R8, a ninth resistor R9, a tenth resistor R10, an eleventh resistor R11, a twelfth resistor R12, a thirteenth resistor R13, a fourteenth resistor R14, and a fifteenth resistor R15.

A first virtual Hall signal output end B1 of the brushless motor is electrically connected to a first end of the third resistor R3 and a first end of the fifteenth resistor R15. A second end of the third resistor R3 is electrically connected to a positive phase input end of the second operational amplifier A2 and a first end of the second resistor R. A second end of the second resistor R2 is electrically connected to a first end of the first resistor R1 and an output end of the second operational amplifier A2. A second end of the first resistor R1 is electrically connected to an output end of the first operational amplifier A1 and a positive phase input end of the first operational amplifier A. The output end of the first operational amplifier A1 serves as a first output end C1 of the feedback signal construction circuit. A negative phase input end of the first operational amplifier A1 is grounded. A negative phase input end of the second operational amplifier A2 is electrically connected to a first end of the fourth resistor R4.

A second virtual Hall signal output end B2 of the brushless motor is electrically connected to a first end of the seventh resistor R7 and a first end of the fourteenth resistor R14. A second end of the seventh resistor R7 is electrically a positive phase input end of the fourth operational amplifier A4 and a first end of the sixth resistor R6. A second end of the sixth resistor R6 is electrically connected to a first end of the fifth resistor R5 and an output end of the fourth operational amplifier A4. A second end of the fifth resistor R5 is electrically connected to an output end of the third operational amplifier A3 and a positive phase input end of the third operational amplifier A3. The output end of the third operational amplifier A3 serves as a second output end C2 of the feedback signal construction circuit. A negative phase input end of the third operational amplifier A3 is grounded. A negative phase input end of the fourth operational amplifier A4 is electrically connected to a first end of the eighth resistor R8.

A third virtual Hall signal output end B3 of the brushless motor is electrically connected to a first end of the eleventh resistor R11 and a first end of the thirteenth resistor R13. A second end of the eleventh resistor R11 is electrically connected to a positive phase input end of the sixth operational amplifier A6 and a first end of the tenth resistor R10. A second end of the tenth resistor R10 is electrically connected to a first end of the ninth resistor R9 and an output end of the sixth operational amplifier A6. A second end of the ninth resistor R9 is electrically connected to an output end of the fifth operational amplifier A5 and a positive phase input end of the fifth operational amplifier A5. The output end of the fifth operational amplifier A5 serves as a third output end C3 of the feedback signal construction circuit. A negative phase input end of the fifth operational amplifier A5 is grounded. A negative phase input end of the sixth operational amplifier A6 is electrically connected to a first end of the twelfth resistor R12.

A second end of the fourth resistor R4 is electrically connected to a second end of the eighth resistor R8, a second end of the twelfth resistor R12, a second end of the thirteenth resistor R13, a second end of the fourteenth resistor R14 and a second end of the fifteenth resistor R15.

Figure 4:
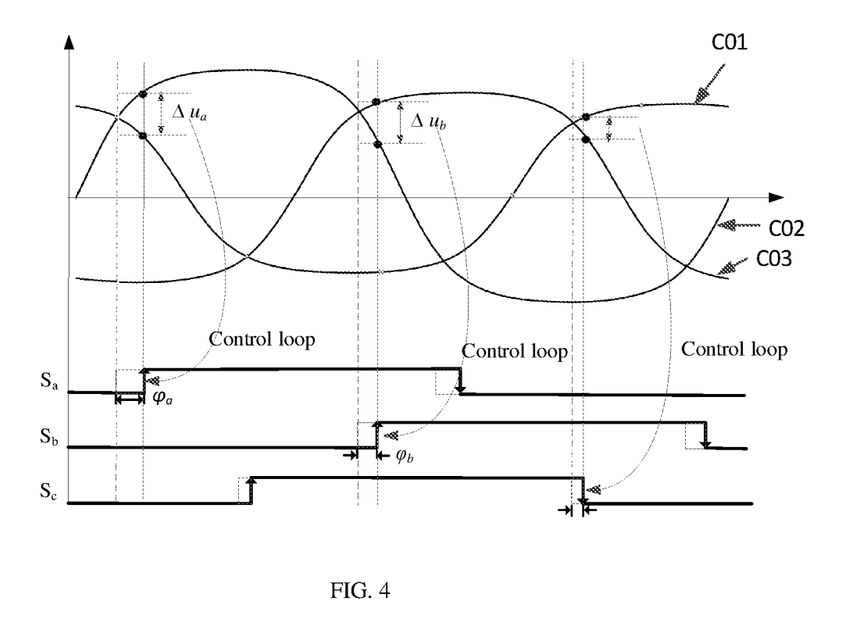
FIG. 4 is an oscillogram of three virtual Hall signals and three basic signals during the operation of the sensorless commutation error compensation for the brushless motor in accordance with the embodiment of the present disclosure.

FIG. 4 is an oscillogram of three virtual Hall signals and three basic signals during the operation of the sensorless commutation error compensation for the brushless motor in accordance with the embodiment of the present disclosure. In FIG. 4, Sa, Sb and Sc represent three virtual Hall signals output by a brushless direct-current motor. C01, C02 and C03 represent three basic signals.

Continuously referring to FIGS. 2-4, the virtual Hall signal Sa is input into the feedback signal construction circuit 20 through the first virtual Hall signal output end B1 of the brushless motor, and then recombined with other virtual Hall signals to obtain the first basic signal C01. The first basic signal C01 is output through the first output end C1 of the feedback signal construction circuit 20.

Similarly, the virtual Hall signal Sb is input into the feedback signal construction circuit 20 through the second virtual Hall signal output end B2 of the brushless motor, and then recombined with other virtual Hall signals to obtain the second basic signal C02. The second basic signal C02 is output through the second output end C2 of the feedback signal construction circuit 20.

The virtual Hall signal Sc is input into the feedback signal construction circuit 20 through the third virtual Hall signal output end B3 of the brushless motor, and then recombined with other virtual Hall signals to obtain the third basic signal C03. The third basic signal C03 is output through the third output end C3 of the feedback signal construction circuit 20.

Referring to FIG. 2, optionally, in the sensorless commutation error compensation system for the brushless motor, the sampling circuit 10 may include an analog switch 11, an analog-to-digital converter (ADC) 12, and a field programmable gate array (FPGA) 13. In the sampling circuit 10, the three input ends connected to the three output ends of the feedback signal construction circuit 20 are all first-type input ends of the sampling circuit. The analog switch 11 is electrically connected to the three first-type input ends and is capable of independently controlling each of the first-type input ends. The analog-to-digital converter 12 is electrically connected to the analog switch 11. An input end of the field programmable gate array 13 is electrically connected to the three virtual Hall signal output ends of the brushless motor 200 and the three output ends of the commutation error controller 30. An output end of the field programmable gate array 13 is connected to the three input ends of the commutation error controller 30. The field programmable gate array 13 is configured to determine a sampling time and a sampling object according to operation of the brushless motor 100, sample by means of controlling the analog switch 11 to switch on and off, and output a sampling result.

There is a plurality of specific implementation methods for the field programmable gate array 13 to determine the sampling time and the sampling object according to the operation of the brushless motor 100, sample by means of controlling the analog switch 11 to switch on and off, and output the sampling result. The following two specific implementation methods are given by way of example, but do not limit the present disclosure.

Optionally, in the first implementation method, the field programmable gate array is specifically used for:

first, according to the three virtual Hall signals of the brushless motor, determining the sampling time and the sampling object. The sampling time comprises a first sampling time $t_1$ and a second sampling time $t_2$. For the same virtual Hall signal, the first sampling time $t_1$ is before a rising edge of the virtual Hall signal, and the second sampling time $t_2$ is after the rising edge of the virtual Hall signal.

Optionally, the sampling time may be determined according to a counter-electromotive force zero-crossing time of the virtual Hall signal and the error compensation angle output by the commutation error controller in last cycle.

There is a plurality of methods to determine the sampling object, for example, a low level is 0 and a high level is 1. Before a rising edge of a virtual Hall signal Sa, the three virtual Hall signals may be represented as 000 in the order of Sa, Sb, and Sc. After the rising edge of a virtual Hall signal Sa, the three virtual Hall signals may be represented as 100 in the order of Sa, Sb, and Sc. Before a rising edge of a virtual Hall signal Sb, the three virtual Hall signals may be represented as 101 in the order of Sa, Sb, and Sc. After the rising edge of the virtual Hall signal Sb, the three virtual Hall signals may be represented as 111 in the order of Sa, Sb, and Sc. Before a rising edge of a virtual Hall signal Sc, the three virtual Hall signals may be represented as 100 in the order of Sa, Sb and Sc. After the rising edge of the virtual Hall signal Sc, the three virtual Hall signals may be represented as 101 in the order of Sa, Sb, and Sc. That is, before and after the rising edge of the virtual Hall signal Sa, the three virtual Hall signals change from 000 to 100. Before and after the rising edge of the virtual Hall signal Sb, the three virtual Hall signals changed from 101 to 111. Before and after the rising edge of the virtual Hall signal Sc, the three virtual Hall signals change from 100 to 101.

Accordingly, a correspondence between changes of the virtual Hall signals before and after the rising edge and the sampling object may be preset, and the correspondence may be stored in the field programmable gate array. Before sampling, the field programmable gate array acquires the three virtual Hall signals directly input by the brushless motor into the field programmable gate array. In addition, the field programmable gate array determines a correspondence between the sampling time and the sampling object on the basis of the changes of the three virtual Hall signals, the sampling time, and the correspondence.

Secondly, the field programmable gate array is specifically used for controlling an on-off status of the analog switch for sampling to obtain and output the sampling result; wherein a voltage collected at the first sampling time $t_1$ is $u_1$, a voltage collected at the second sampling time $t_2$ is $u_2$, and the sampling result is that $\Delta u = u_2 - u_1$.

Optionally, according to the correspondence between the sampling time and the sampling object, the on-off status of the analog switch is controlled, so that at a certain sampling time, only a signal of a sampling object corresponding to the sampling time is allowed to be input into the field programmable gate array.

For example, in FIG. 4, before and after the rising edge of the virtual Hall signal Sa, the sampling result is that $\Delta u = u_a$. In FIG. 4, before and after the rising edge of the virtual Hall signal Sb, the sampling result is that $\Delta u = u_b$.

Optionally, in the second implementation method, the field programmable gate array is specifically used for:

first, according to the three virtual Hall signals of the brushless motor, determining a counter-electromotive force zero-crossing time and a sampling object. The sampling time comprises a first sampling time $t_1$, a third sampling time $t_3$ and a fourth sampling time $t_4$; for the same virtual Hall signal, the first sampling time $t_1$ is before a rising edge of the virtual Hall signal, and the third sampling time $t_3$ and the fourth sampling time $t_4$ are both after the rising edge of the virtual Hall signal; a time $2t_3-t_4$ is after the rising edge of the virtual Hall signal; and $t_4-t_3$ is greater than a freewheeling time of the brushless motor, and is less than or equal to 1.5 times of the freewheeling time of the brushless motor.

Secondly, the field programmable gate array is specifically used for controlling an on-off status of the analog switch for sampling to obtain and output the sampling result; wherein a voltage collected at the first sampling time $t_1$ is $u_1$, a voltage collected at the third sampling time $t_3$ is $u_3$, a voltage collected at the fourth sampling time $t_4$ is $u_4$, and the sampling result is that $\Delta u = 2u_3 - u_4 - u_1$.

Figure 5:
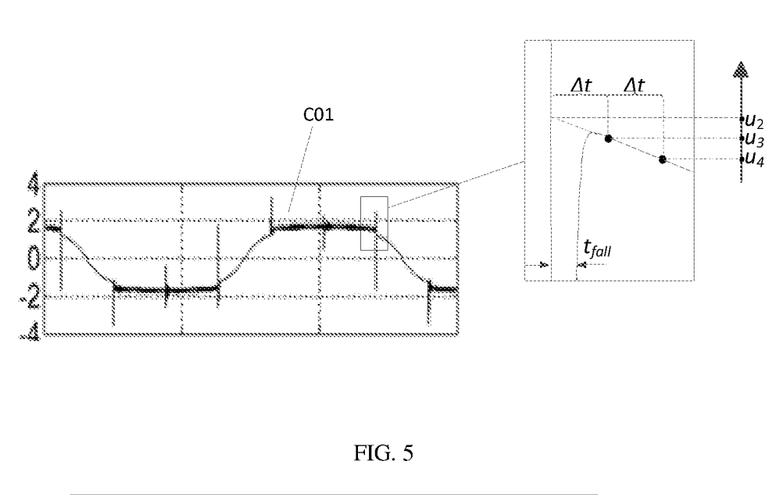
FIG. 5 is a schematic diagram of determining a sampling time in accordance with the embodiment of the present disclosure.

FIG. 5 is a schematic diagram of determining a sampling time in accordance with the embodiment of the present disclosure. Referring to FIG. 5, before and after the rising edge of the virtual Hall signal, if a freewheeling phenomenon occurs to the brushless motor, waveforms of the basic signals will suddenly change, resulting in "burr" on the waveforms. Obviously, in this case, if the first implementation method is adopted, in the case the second sampling time $t_2$ determined is just within the freewheeling period of the brushless motor, the $u_2$ collected at the second sampling time $t_2$ has a larger deviation. Compared with the first implementation method, the second implementation method does not directly sample at the second sampling time $t_2$, but samples at the third sampling time $t_3$ and the fourth sampling time $t_4$, and then takes $2 u_3 - u_4$ as a voltage value of the sampling object at the second sampling time $t_2$. In this way, influences of the freewheeling process of the brushless motor on commutation error compensation may be reduced.

Based on the foregoing technical solution, continuously referring to FIG. 2 and FIG. 3, the commutation error controller 30 comprises a PID controller 31 and a first operation module 32. Input ends of the PID controller 31 are electrically connected to the output ends of the sampling circuit 20, output ends of the PID controller 31 are electrically connected to input ends of the first operation module 32, and the PID controller 31 is used for determining a commutation error compensation angle signal according to the sampling result. Output ends of the first operation module 32 are electrically connected to the commutation logic module 40, and the input ends of the first operation circuit 32 are also connected to the three virtual Hall signal output ends of the brushless motor 200. The first operation module 32 is also used for receiving corrections. Optionally, the first operation circuit 32 may also receive or set a correction $\theta_0$. Further, it may be set that $\theta_0 = 30°$. The output ends of the first operation module 32 are also connected to the input ends of the sampling circuit 10. The first operation module 32 is used for respectively superimposing the three error compensation angle signals and the three virtual Hall signals to form the superposition results.

Optionally, the PID controller is used for determining the commutation error compensation angle signals according to the sampling result and the following formula:

$$\phi = k_p \Delta u + k_i \int \Delta u dt + k_d \frac{d(\Delta u)}{dt},$$

wherein $\phi$ is the commutation error compensation angle, and $k_p$, $k_i$ and $k_d$ are parameters of the PID controller.

Optionally, further referring to FIG. 2, it may be set that the sensorless commutation error compensation system for the brushless motor further comprises a current measuring circuit 61 and a current controller 62. The current measuring circuit 61 is connected to the brushless motor 200. An input end of the current controller 62 is connected to the current measuring circuit 61. An output end of the current controller 62 is connected to the commutation logic module 40. The current measuring circuit 61 is used for measuring a current of the brushless motor 200 and sending the current to the current controller 62 for current loop control.

Optionally, further referring to FIG. 2, the sensorless commutation error compensation system for the brushless motor may further include a speed measuring circuit 71 and a speed controller 72. The speed measuring circuit 71 is connected to the brushless motor 200. An input end of the speed controller 72 is connected to the speed measuring circuit 71. An output end of the speed controller 72 is connected to the commutation logic module 40. The speed measuring circuit 71 is used for measuring a speed of the brushless motor 200 and sending the speed to the speed controller 72 for speed loop control.

It should be noted that the above sensorless commutation error compensation for the brushless motor may be applicable to either three-phase symmetric brushless motor or three-phase asymmetric brushless motor. The above sensorless commutation error compensation for the brushless motor may be applicable to both non-ideal counter-electromotive force brushless motor and ideal counter-electromotive force brushless motor.

Typically, in the foregoing solution, the brushless motor is a three-phase asymmetric brushless motor. For the three-phase asymmetric brushless motor, the counter-electromotive forces and currents of the three phases are no longer symmetrical, which makes the error angles of the virtual Hall signals for three-way commutation no longer consistent. In this case, because it is difficult to reflect commutation errors by using only feedback information of one phase, the commutation errors will not be eliminated fundamentally. However, in the technical solution in accordance with the present disclosure, the commutation errors can be eliminated fundamentally as the feedback information of the three phases is adopted to compensate the commutation errors.

Figure 6:
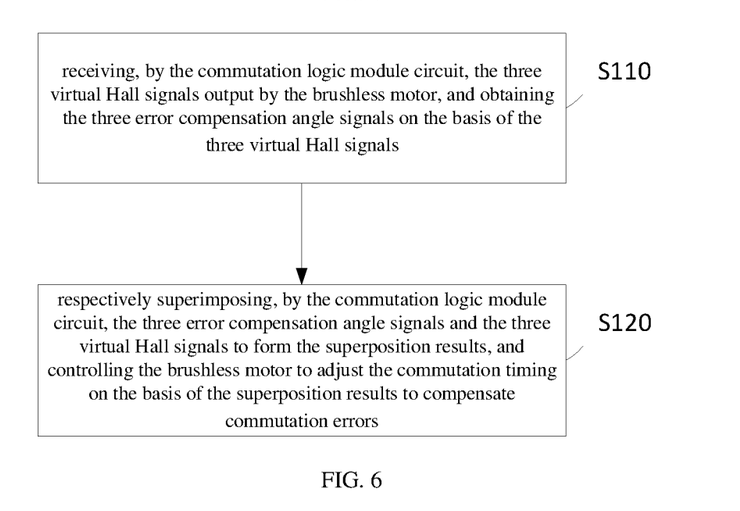
FIG. 6 is a flowchart of a sensorless commutation error compensation method for a brushless motor in accordance with an embodiment of the present disclosure.

Based on the same inventive concept, an embodiment of the present disclosure also provides a sensorless commutation error compensation method for a brushless motor. FIG. 6 is a flowchart of the sensorless commutation error compensation method for the brushless motor in accordance with the embodiment of the present disclosure. The sensorless commutation error compensation method for the brushless motor is applicable to any of the sensorless commutation error compensation system for the brushless motor in accordance with the embodiments of the present disclosure.

Referring to FIG. 6, the sensorless commutation error compensation method for the brushless motor comprises:

S110: receiving, by the commutation logic module circuit, the three virtual Hall signals output by the brushless motor, and obtaining the three error compensation angle signals based on the three virtual Hall signals; and S120: superimposing, by the commutation logic module circuit, the three error compensation angle signals and the three virtual Hall signals, respectively, to form the superposition results, and controlling the brushless motor to adjust the commutation timing on the basis of the superposition results, so as to achieve commutation error compensation.

As the sensorless commutation error compensation method for the brushless motor in accordance with the present disclosure is applicable to any of the sensorless commutation error compensation system for the brushless motor in accordance with the embodiments of the present disclosure, the method has the same or corresponding beneficial effects as the applicable sensorless commutation error compensation for the brushless motor thereof, and will not be elaborated herein.

It should be noted that relational terms herein such as "first" and "second" and the like, are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, a method, an article, or a device including a series of elements, includes not only those elements but also includes other elements not expressly listed, or also includes elements inherent to such process, method, article, or device. In the absence of further limitation, an element defined by the phrase "including a . . . " does not exclude the presence of the same element in the process, method, article, or device.

The above are only specific embodiments of the present disclosure, so that those skilled in the art can understand or realize the present disclosure. Many modifications to these embodiments will be obvious to those skilled in the art, and the general principles defined herein can be implemented in other embodiments without departing from the spirit or scope of the present disclosure. Therefore, the present disclosure will not to be limited to these embodiments shown herein, but is to be in conformity with the widest scope consistent with the principles and novel features disclosed herein.

INDUSTRIAL APPLICABILITY

The sensorless commutation error compensation system for the brushless motor in accordance with the present disclosure controls commutation errors based on currents and counter-electromotive forces of three phases, reduces a torque ripple of the brushless direct-current motor, improves a working efficiency of the motor, and has high industrial applicability.

The invention claimed is:

1. A sensorless commutation error compensation system, comprising:
a brushless motor; and
a commutation logic module circuit, wherein the commutation logic module circuit is connected to three virtual Hall signal output ends of the brushless motor, wherein the commutation logic module circuit comprises a sampling circuit, a feedback signal construction circuit, a commutation error controller, a commutation logic module, and a full-bridge circuit, wherein input ends of the feedback signal construction circuit are connected to three virtual Hall signal output ends of the brushless motor; wherein output ends of the feedback signal construction circuit, the three virtual Hall signal output ends of the brushless motor, and three output ends of the commutation error controller are all connected to input ends of the sampling circuit, wherein three output ends of the sampling circuit are connected to three input ends of the commutation error controller, wherein the three output ends of the commutation error controller are also electrically connected to three input ends of the commutation logic module in one-to-one correspondence, wherein the input ends of the commutation error controller are connected to the three virtual Hall signal output ends of the brushless motor, wherein an output end of the commutation logic module is connected to an input end of the full-bridge circuit, and wherein an output end of the full-bridge circuit is connected to an input end of the brushless motor, and wherein the commutation logic module circuit is configured to:
receive three virtual Hall signals output by the brushless motor;
obtain three error compensation angle signals based on the three virtual Hall signals;
superimpose the three error compensation angle signals and the three virtual Hall signals, respectively, to form superposition results; and
control the brushless motor to adjust commutation timing based on the superposition results to achieve commutation error compensation.

2. The sensorless commutation error compensation system according to claim 1, wherein the feedback signal construction circuit comprises a first operational amplifier, a second operational amplifier, a third operational amplifier, a fourth operational amplifier, a fifth operational amplifier, a sixth operational amplifier, a first resistor, a second resistor, a third resistor, a fourth resistor, a fifth resistor, a sixth resistor, a seventh resistor, an eighth resistor, a ninth resistor, a tenth resistor, an eleventh resistor, a twelfth resistor, a thirteenth resistor, a fourteenth resistor, and a fifteenth resistor;
wherein a first virtual Hall signal output end of the brushless motor is electrically connected to a first end of the third resistor and a first end of the fifteenth resistor, wherein a second end of the third resistor is electrically connected to a positive phase input end of the second operational amplifier and a first end of the second resistor, wherein a second end of the second resistor is electrically connected to a first end of the first resistor and an output end of the second operational amplifier, wherein a second end of the first resistor is electrically connected to an output end of the first operational amplifier and a positive phase input end of the first operational amplifier, wherein the output end of the first operational amplifier functions as a first output end of the feedback signal construction circuit, wherein a negative phase input end of the first operational amplifier is grounded, wherein a negative phase input end of the second operational amplifier is electrically connected to a first end of the fourth resistor;
wherein a second virtual Hall signal output end of the brushless motor is electrically connected to a first end of the seventh resistor and a first end of the fourteenth resistor, wherein a second end of the seventh resistor is electrically a positive phase input end of the fourth operational amplifier and a first end of the sixth resistor, wherein a second end of the sixth resistor is electrically connected to a first end of the fifth resistor and an output end of the fourth operational amplifier, wherein a second end of the fifth resistor is electrically connected to an output end of the third operational amplifier and a positive phase input end of the third operational amplifier, and wherein the output end of the third operational amplifier functions as a second output end of the feedback signal construction circuit, wherein a negative phase input end of the third operational amplifier is grounded, wherein a negative phase input end of the fourth operational amplifier is electrically connected to a first end of the eighth resistor;
wherein a third virtual Hall signal output end of the brushless motor is electrically connected to a first end of the eleventh resistor and a first end of the thirteenth resistor, wherein a second end of the eleventh resistor is electrically connected to a positive phase input end of the sixth operational amplifier and a first end of the tenth resistor, wherein a second end of the tenth resistor is electrically connected to a first end of the ninth resistor and an output end of the sixth operational amplifier, wherein a second end of the ninth resistor is electrically connected to an output end of the fifth operational amplifier and a positive phase input end of the fifth operational amplifier, wherein the output end of the fifth operational amplifier functions as a third output end of the feedback signal construction circuit, wherein a negative phase input end of the fifth operational amplifier is grounded; wherein a negative phase input end of the sixth operational amplifier is electrically connected to a first end of the twelfth resistor; and
wherein a second end of the fourth resistor is electrically connected to a second end of the eighth resistor, a second end of the twelfth resistor, a second end of the thirteenth resistor, a second end of the fourteenth resistor and a second end of the fifteenth resistor.

3. The sensorless commutation error compensation system according to claim 1, wherein the sampling circuit comprises an analog switch, an analog-to-digital converter, and a field programmable gate array;
wherein in the sampling circuit, the three input ends connected to the three output ends of the feedback signal construction circuit are all first-type input ends of the sampling circuit;
wherein the analog switch is electrically connected to the three first-type input ends, and is capable of independently controlling each of the first-type input ends;
wherein the analog-to-digital converter is electrically connected to the analog switch; and
wherein an input end of the field programmable gate array is electrically connected to the three virtual Hall signal output ends of the brushless motor and the three output ends of the commutation error controller; wherein an output end of the field programmable gate array is connected to the three input ends of the commutation error controller; and wherein the field programmable gate array is configured to determine a sampling time and a sampling object according to operations of the brushless motor, sample by means of controlling the analog switch to switch on and off, and output a sampling result.

4. The sensorless commutation error compensation system according to claim 3, wherein the field programmable gate array is to:
according to the three virtual Hall signals of the brushless motor, determine the sampling time and the sampling object; wherein the sampling time comprises a first sampling time $t_1$ and a second sampling time $t_2$; and wherein for the same virtual Hall signal, the first sampling time $t_1$ is before a rising edge of the virtual Hall signal, and the second sampling time $t_2$ is after the rising edge of the virtual Hall signal; and
control an on-off status of the analog switch for sampling to obtain and output the sampling result; wherein a voltage collected at the first sampling time $t_1$ is $u_1$, a voltage collected at the second sampling time $t_2$ is $u_2$, and the sampling result is that $\Delta u = u_2 - u_1$.

5. The sensorless commutation error compensation system according to claim 3, wherein the field programmable gate array is to:
    according to the three virtual Hall signals of the brushless motor, determine the sampling time and the sampling object; wherein the sampling time comprises a first sampling time $t_1$, a third sampling time $t_3$ and a fourth sampling time $t_4$; wherein for the same virtual Hall signal, the first sampling time $t_1$ is before a rising edge of the virtual Hall signal, and wherein the third sampling time $t_3$ and the fourth sampling time $t_4$ are both after the rising edge of the virtual Hall signal; wherein a time $2t_3-t_4$ is after the rising edge of the virtual Hall signal; and wherein $t_4-t_3$ is greater than a freewheeling time of the brushless motor, and is less than or equal to 1.5 times of the freewheeling time of the brushless motor; and
    control an on-off status of the analog switch for sampling to obtain and output the sampling result, wherein a voltage collected at the first sampling time $t_1$ is $u_1$, wherein a voltage collected at the third sampling time $t_3$ is $u_3$, wherein a voltage collected at the fourth sampling time $t_4$ is $u_4$, and wherein the sampling result is that $\Delta u = 2u_3 - u_4 - u_1$.

6. The sensorless commutation error compensation system according to claim 3, wherein the commutation error controller comprises a PID controller and a first operation module;
    wherein input ends of the PID controller are electrically connected to the output ends of the sampling circuit, wherein output ends of the PID controller are electrically connected to input ends of the first operation module, and wherein the PID controller is to determine a commutation error compensation angle signal according to the sampling result; and
    wherein output ends of the first operation module are electrically connected to the commutation logic module, and the input ends of the first operation circuit are also connected to the three virtual Hall signal output ends of the brushless motor; wherein the output ends of the first operation module are also connected to the input ends of the sampling circuit; and wherein the first operation module is to superimpose the three error compensation angle signals and the three virtual Hall signals to form the superposition results, respectively.

7. The sensorless commutation error compensation system according to claim 6, wherein the PID controller is to determine the commutation error compensation angle signals according to the sampling result and the following formula:

$$\phi = k_p \Delta u + k_i \int \Delta u dt + k_d \frac{d(\Delta u)}{dt},$$

wherein $\phi$ is the commutation error compensation angle, and wherein $k_p$, $k_i$ and $k_d$ are parameters of the PID controller.

8. The sensorless commutation error compensation system according to claim 1, wherein the brushless motor is a three-phase asymmetric brushless motor.

9. A method for performing sensorless commutation error compensation, comprising:
    receiving, by a feedback signal construction circuit of a commutation logic module circuit, three virtual Hall signals output by a brushless motor;
    obtaining, by a commutation error controller of the communication logic module circuit, three error compensation angle signals based on the three virtual Hall signals;
    superimposing, by the commutation error controller of the communication logic module circuit, the three error compensation angle signals and the three virtual Hall signals, respectively, to form superposition results; and
    controlling, by a commutation logic module of the communication logic module circuit, the brushless motor to adjust commutation timing based on the superposition results to achieve commutation error compensation, wherein the commutation logic module circuit further comprises a sampling circuit and a full-bridge circuit, wherein output ends of the feedback signal construction circuit, the three virtual Hall signal output ends of the brushless motor, and three output ends of the commutation error controller are all connected to input ends of the sampling circuit, wherein three output ends of the sampling circuit are connected to three input ends of the commutation error controller, wherein the three output ends of the commutation error controller are also electrically connected to three input ends of the commutation logic module in one-to-one correspondence, wherein the input ends of the commutation error controller are connected to the three virtual Hall signal output ends of the brushless motor, wherein an output end of the commutation logic module is connected to an input end of the full-bridge circuit, and wherein an output end of the full-bridge circuit is connected to an input end of the brushless motor.

* * * * *